2 Sheets—Sheet 1.

J. PIERPONT.
Combined Riding and Walking Cultivators.

No. 223,755. Patented Jan. 20, 1880.

Witnesses
Fred G. Dietrich
F. B. Brock

Inventor
J. Pierpont
By W. B. Richard
atty.

J. PIERPONT.
Combined Riding and Walking Cultivators.
No. 223,755. Patented Jan. 20, 1880.
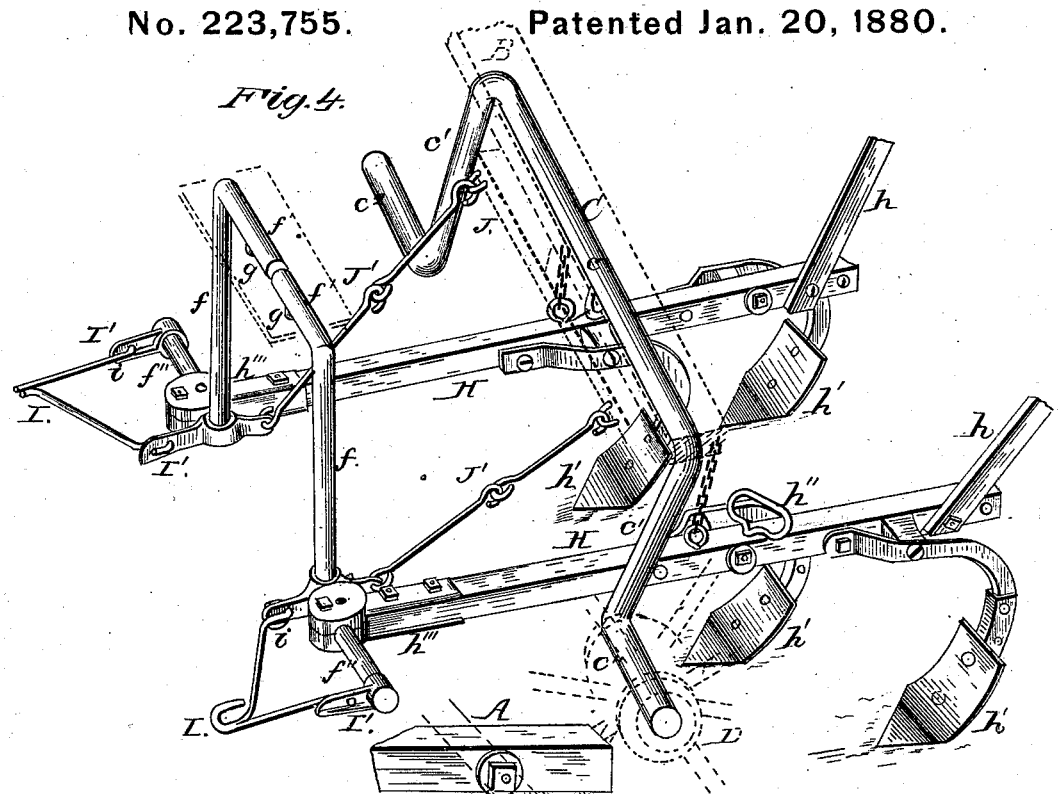
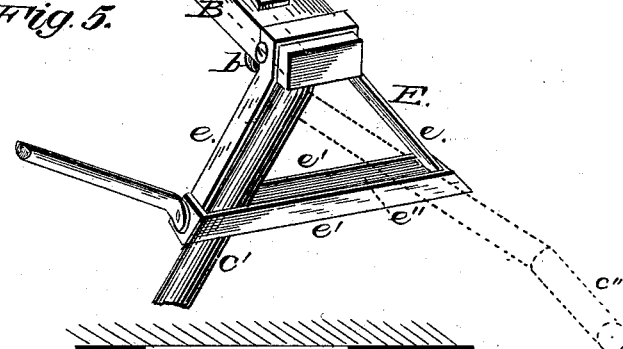
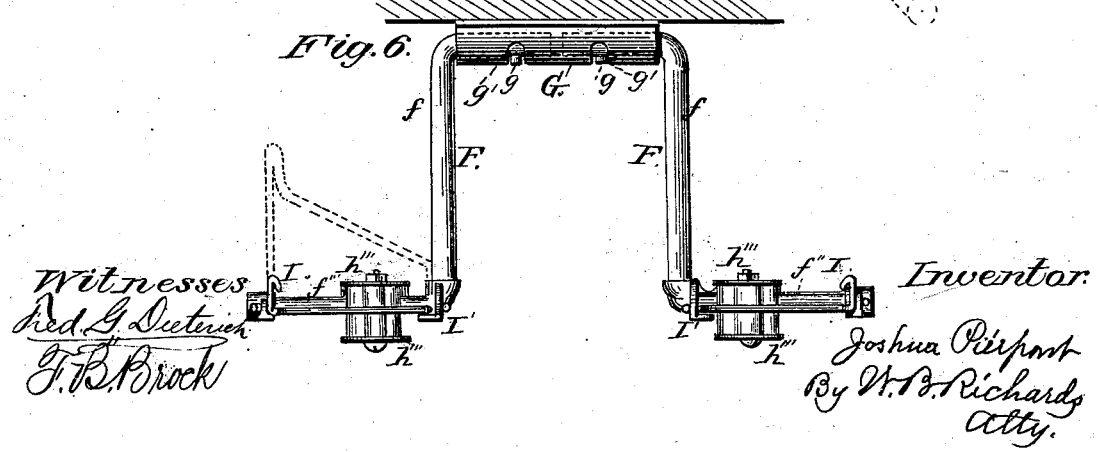

UNITED STATES PATENT OFFICE.

JOSHUA PIERPONT, OF BUSHNELL, ILLINOIS, ASSIGNOR TO PIERPONT & TUTTLE, OF SAME PLACE.

COMBINED RIDING AND WALKING CULTIVATOR.

SPECIFICATION forming part of Letters Patent No. 223,755, dated January 20, 1880.

Application filed August 15, 1879.

*To all whom it may concern:*

Be it known that I, JOSHUA PIERPONT, of Bushnell, in the county of McDonough and State of Illinois, have invented certain new and useful Improvements in Combined Riding and Walking Cultivators; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
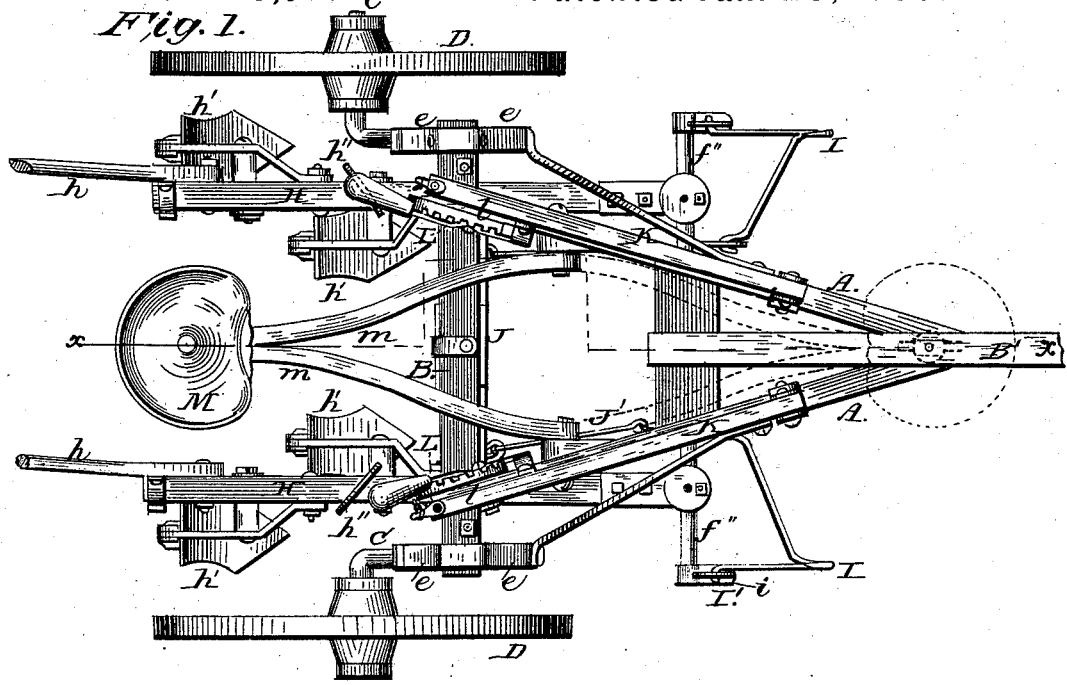
Figure 2:
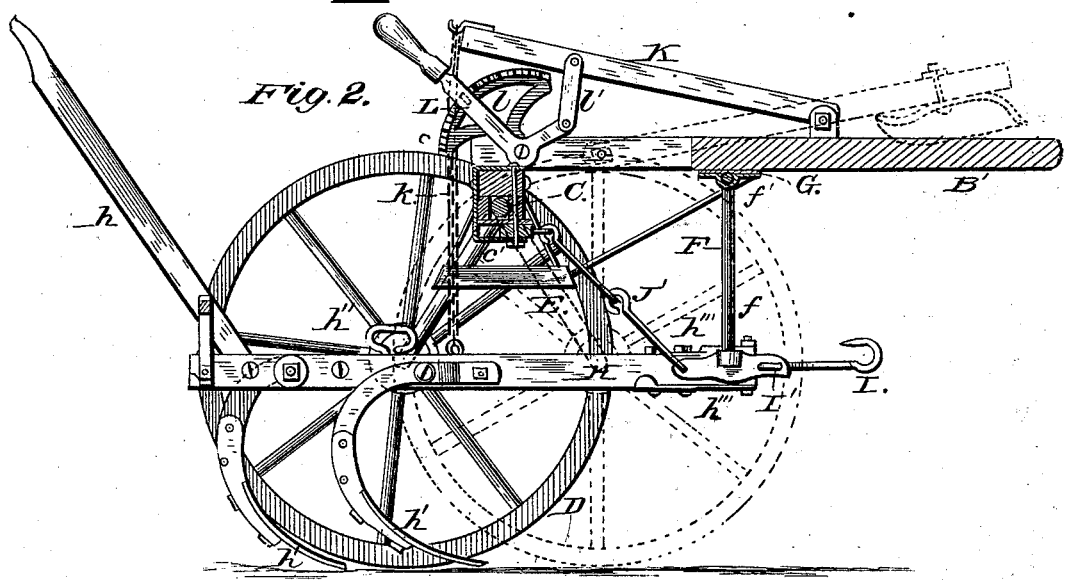
Figure 3:
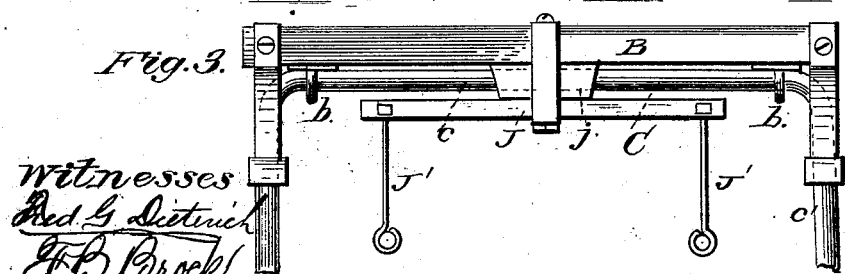

Figure 1 is a top-plan view of a cultivator embodying my invention. Fig. 2 is a vertical sectional view in the line $x\ x$ in Fig. 1. Fig. 3 is a rear elevation of the axle and part of the adjacent parts. Fig. 4 is a perspective view, showing the axle and the plow-gangs and their front connections and equalizing-bar; other parts removed. Fig. 5 is a perspective view of one end of the axle and the slotted pendant which retains it in different positions. Fig. 6 is a front elevation of the pendants by which the plows are hinged to the main frame.

This invention relates to cultivators, and, principally, to cultivators which may be used as riding or as walking machines; and it consists, first, in an arched axle hinged or journaled at its central elevated portion to the main frame of the machine in such manner that it may be turned forward and backward at its lower ends to make the machine either a riding or a walking cultivator; second, in combination with plow-gangs connected at their forward ends to oscillating pendants forward of the axle, an equalizing-bar pivoted to the main frame in rear of the forward ends of the plow-gangs, with which forward ends it is connected by suitable links; third, in combination with a main frame and axle journaled thereto and plow-gangs hinged to pendants forward of the axle, an equalizing-bar pivoted below the axle and connected by links with the forward ends of the plow-beams; fourth, in combination with plow-gangs hinged at their forward ends to pendants from the main frame forward of the axle, an oscillating axle, and levers hinged or journaled at their forward ends forward of the axle, and connected by cords or chains at their rear ends with the plow-gangs.

The invention further consists in constructions and combinations of parts hereinafter described, and set forth in the claims hereto annexed.

Referring to the drawings by letters, letter A represents hounds, attached at their divergent rear ends to a transverse bar, B, and at their convergent front ends to the guide pole or tongue B'. The tongue, hounds, and bar B constitute what I term the "main frame" of the machine.

C is the axle, formed with an elevated central part, $c$, side parts, $c'\ c'$, and horizontal ends $c''$, which ends $c''$ are formed into journals or spindles for the supporting-wheels D.

The central part, $c$, of the axle is journaled to the under side of the bar B by means of eyebolts $b\ b$, so as to permit of oscillating or vibrating the vertical parts $c'$ in vertical planes at right angles to the bar B, and the axle is integral, so that the parts $c'\ c'$ move simultaneously.

E E are inverted-V-shaped pendants, one from each end of the bar B, each pendant formed of bars $e\ e$, diverging, and connected at their lower ends by a bar, $e'$, which has a slot, $e''$, through which a vertical part, $c'$, of the axle passes. The slots $e''$ permit inclining the parts $c'$ of the axle rearward at their lower ends, as shown by full lines at Fig. 2 of the drawings, and forward, as shown by dotted lines at same figure.

F F are pendants, each having a vertical part, $f$, an upper part, $f'$, bent at right angles to the part $f$, and a lower part, $f'''$, bent from the part $f$ in an opposite direction to the part $f'$. The upper ends of the pendants F are journaled in a plate, G, which is secured to the under side of the hounds, and are held in said plate G by studs $g$, which project one from each part $f'$ through a slot, $g'$, in the plate G, so as to permit vibrating or oscillating the pendants independently of each other in vertical planes at right angles to the bar B.

H H are the plows, each provided with ordinary handles $h$, plows or shovels $h'$, foot-stirrups $h''$, and coupling-plates $h'''$, by which coupling-plates the front ends of the plow-beams are hinged one to the horizontal part $f''$ of each pendant F in any ordinary manner, to permit of the plow-beams being raised and lowered and moved laterally at their rear ends, and hence to permit of the pendants F vibrating from the front toward the rear of the machine while in operation.

I I are the draft-hooks, the rear divergent ends of which are hinged to plates I', which project from the parts $f''$ of the pendants F, so that their front ends may be raised and lowered from a horizontal position, below which they are prevented going by stops $i$, which project from the plates I. A draft-hook, I, being thus connected with each independent pendant F, and each pendant F being connected with a plow, it will be seen that each draft-animal will, to a great extent, draw the plow to which it is connected. To equalize the draft, however, in extreme variations of advance of either draft-animal, I provide an equalizing-bar, J, pivoted at its central part to a block, $j$, which is secured to the under side of the bar B. Links J' connect the ends of the equalizing-bar J, one with the lower end of each pendant F.

K K are levers, pivoted or hinged at their front ends one to each hound A forward of the bar B, and their rear ends connected by chains or cords $k$, one to each plow-beam H, so that the plows may be raised and lowered by raising and lowering the rear ends of the levers K.

L L are elbow-shaped spring hand-levers, pivoted at their elbows, one to the rear end of each hound A, and each connected with a segment rack-bar, $l$, with which its upper end may be engaged in the ordinary manner. The lower ends of the levers L are each connected by a link, $l'$, with a lever, K, so that the levers L may be used to operate the levers K to raise and lower the plows, and the levers L engaged with their respective rack-bars to gage the depth of penetration of the shovels and to suspend the plows above the ground when desired.

M is the driver's seat, secured to the rear ends of two bars, $m\ m$, the forward ends of which are separated and pivoted or hinged one to each hound A in advance of the bar B, and their rear ends brought together and secured to the seat M, which they support. The separate forward ends of the seat-supporting bars $m$ enable the driver to see the plants immediately in advance of the plow-shovels, and their hinge permits turning the bars $m$ up, as shown by full lines at Fig. 1 of the drawings, or down to a horizontal position, and resting on the bar B as a support, as shown by dotted lines at same figure.

In using the machine as a riding-cultivator the driver's seat is turned down to the position shown by full lines at Fig. 1. The levers L are then within reach of his hands to raise and lower the plows, and with his feet in the stirrups $h''$ he may control their lateral movements as desired, to avoid plants out of line, and which are plainly visible to him through the open forward ends of the bars $m$.

To balance the machine with the driver in his seat, the axle may be turned back to the position shown by full lines at Fig. 2 of the drawings.

In using the machine as a walking-cultivator the axle may be turned forward to the position shown by dotted lines at Fig. 2 and by full lines at Figs. 4 and 5 of the drawings, and the seat turned forward out of the way, as shown at Fig. 2.

In use either as a riding or walking cultivator either plow may advance or recede with relation to the other plow without disturbing the direct line of progression of the wheels D, and without changing the distance between the plow-beams, and each draft-animal may advance or recede with relation to its fellow draft-animal with the same results.

What I claim as new, and desire to secure by Letters Patent, is—

1. In combination with the main frame A B B', having the plows secured thereto by pendants F, forward of the axle, the axle C, constructed substantially as described, and journaled to the bar B, so that it may be adjusted to fix the wheels D forward or in rear of the bar B, substantially as shown and described, and for the purpose specified.

2. In combination with the main frame of a cultivator having the plows secured thereto at their forward ends forward of the axle by the independently-oscillating pendants F, the pendants E, with slotted lower ends, adapted to receive the side parts, $c'$, of the axle, and to act as stops in adjusting the axle, substantially as and for the purpose specified.

3. In combination with the main frame and oscillating axle and plow-gangs hinged to oscillating pendants forward of the axle, an equalizing-bar pivoted beneath the axle and connected by links with the plow-beams, substantially as described, and for the purpose specified.

4. In combination with the main frame of a cultivator having the oscillating axle C, so that it may be adjusted to fix the wheels in front or rear of bar B by means of pendants E, and provided with plows secured to the main frame forward of the axle at their forward ends by means of oscillating pendants F, the levers K, hinged at their forward ends to the main frame, and their rear ends connected with the plows by chains or cords, for the purposes specified.

5. In combination with the main frame having the axle-journal adjustable in front or rear of the pivotal line, and provided with independently-oscillating pendants F forward of the axle, and to which the forward ends of the plow-gangs are attached, the equalizing-bar J, connected with the forward ends of said plow-gangs by suitable links or connections, levers K and L, and the hinged driver's seat M, all operating in the manner substantially as and for the purpose specified.

In testimony that I claim the foregoing as my own I affix my signature in presence of two witnesses.

JOSHUA PIERPONT.

Witnesses:
ALLIE L. PIERPONT,
JOSEPH B. McCONNELL.